(12) United States Patent
Shao et al.

(10) Patent No.: US 11,553,532 B2
(45) Date of Patent: Jan. 10, 2023

(54) DELAY REDUCTION METHOD AND APPARATUS

(71) Applicant: Huawei Technologies Co., Ltd., Shenzhen (CN)

(72) Inventors: Hua Shao, Shenzhen (CN); Huang Huang, Chengdu (CN); Mao Yan, Chengdu (CN); Kuandong Gao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 17/018,729

(22) Filed: Sep. 11, 2020

(65) Prior Publication Data

US 2020/0413453 A1 Dec. 31, 2020

Related U.S. Application Data

(63) Continuation of application No. PCT/CN2019/080679, filed on Mar. 29, 2019.

(30) Foreign Application Priority Data

Apr. 4, 2018 (CN) .......................... 201810302075.3

(51) Int. Cl.
*H04W 74/08* (2009.01)
*H04L 5/00* (2006.01)
*H04W 74/00* (2009.01)

(52) U.S. Cl.
CPC ....... *H04W 74/0833* (2013.01); *H04L 5/0082* (2013.01); *H04W 74/002* (2013.01)

(58) Field of Classification Search
CPC ... H04W 74/00; H04W 74/002; H04W 74/08; H04W 74/0833; H04W 56/0045; H04L 5/00; H04L 5/0082
See application file for complete search history.

(56) References Cited

U.S. PATENT DOCUMENTS

2016/0323070 A1* 11/2016 Chen ................. H04W 56/0045
2018/0077732 A1* 3/2018 Yi ....................... H04W 74/008

FOREIGN PATENT DOCUMENTS

CN 101478780 A 7/2009
CN 102647783 A 8/2012
(Continued)

OTHER PUBLICATIONS

"On UL Transmission Timing Aspects," 3GPP TSG RAN WG1 Meeting NR#3, Nagoya, Japan, R1-1716021, pp. 1-2, 3rd Generation Partnership Project, Valbonne, France (Sep. 18-21, 2017).
(Continued)

*Primary Examiner* — Hoon J Chung

(74) *Attorney, Agent, or Firm* — Leydig, Voit & Mayer, Ltd.

(57) ABSTRACT

This application discloses a delay reduction method and apparatus, applied to a random access process. The method includes: sending, by a terminal device, a message 1 to a network device, where the message 1 is a random access preamble; receiving, by the terminal device, a message 2 sent by the network device; and sending, by the terminal device, a message 3 to the network device, where a time gap between receiving the message 2 and sending the message 3 is set by the terminal based on a timing advance (TA) value. In an embodiment, the TA value is related to a message 1 format of the terminal device and a cell radius or subcarrier spacing supported by the message 1. In this solution, a TA value is reduced, and random access efficiency is improved.

16 Claims, 1 Drawing Sheet

(56) References Cited

FOREIGN PATENT DOCUMENTS

| | | |
|---|---|---|
| CN | 103582112 A | 2/2014 |
| CN | 104837160 A | 8/2015 |
| CN | 107567693 A | 1/2018 |
| WO | 2009088345 A2 | 7/2009 |
| WO | 2016175981 A1 | 11/2016 |
| WO | 2018028637 A1 | 2/2018 |

OTHER PUBLICATIONS

"LS on CP latency reduction," 3GPP TSG-RAN WG1 #92, Athens, Greece, R1-1803421, p. 1-2, 3rd Generation Partnership Project, Valbonne, France (Feb. 26-Mar. 2, 2018).

* cited by examiner

DELAY REDUCTION METHOD AND APPARATUS

CROSS-REFERENCE TO RELATED APPLICATIONS

This application is a continuation of International Application No. PCT/CN2019/080679, filed on Mar. 29, 2019, which claims priority to Chinese Patent Application No. 201810302075.3, filed on Apr. 4, 2018. The disclosures of the aforementioned applications are hereby incorporated by reference in their entireties.

TECHNICAL FIELD

This application relates to the field of communications technologies, and in particular, to a delay reduction method and apparatus.

BACKGROUND

In a random access process, a terminal sends a random access preamble (e.g., message 1, Msg1) to a base station. The base station sends a message 2 (e.g., Msg2) to the terminal in response to the random access preamble. After receiving the message 2, the terminal waits for a period of time and then sends a message 3 (e.g., Msg3) to the base station. A problem that currently needs to be resolved relates to identifying how to reduce a time gap between the second and third message (e.g., Msg2 and Msg3) to improve random access efficiency.

SUMMARY

This application provides a delay reduction method and apparatus configured to reduce a delay in a random access process.

According to one aspect of the present disclosure, a delay reduction method is disclosed. The method is applied to a random access process and includes:

sending, by a terminal device, a message 1 to a network device, where the message 1 is a random access preamble; receiving, by the terminal device, a message 2 sent by the network device; and sending, by the terminal device, a message 3 to the network device after a time gap, where the time gap includes a timing advance (TA).

Correspondingly, the network device receives the message 1 sent by the terminal device, sends the message 2 to the terminal device, and receives, after a time gap, the message 3 sent by the terminal device, where the time gap includes the TA.

In the foregoing solution, the TA is related to a message 1 (random access preamble) format of the terminal device.

Alternatively, the TA is related to a message 1 (random access preamble) format of the terminal device and a cell radius supported by the message 1.

In addition, the cell radius may be replaced with one or more of the following beam-related parameters, for example, a coverage area, a coverage direction, a beam identifier, a filtering coefficient for sending or receiving by the base station, and the like. The cell radius may be calculated based on these parameters.

Alternatively, the TA is related to a message 1 (e.g., random access preamble) format of the terminal device and a subcarrier spacing supported by the message 1.

Alternatively, the TA is related to a message 1 (e.g., random access preamble) format of the terminal device, a cell radius supported by the message 1, and a subcarrier spacing supported by the message 1.

According to the foregoing methods, terminal devices having various random access preamble formats are prevented from using a same TA determining method, thereby improving flexibility and further reducing the TA.

The cell radius supported by the message 1 may be a maximum cell radius, and the subcarrier spacing supported by the message 1 may be a minimum subcarrier spacing.

In another implementation, the TA is related to a message 1 (e.g., random access preamble) format of the terminal device, and a minimum subcarrier spacing and/or maximum cell radius of the message 1 in a frequency range of the terminal device. For example, for a high frequency (e.g., greater than or equal to 6 GHz), a corresponding message 1 subcarrier spacing is of 60 kHz or 120 kHz; for a low frequency (e.g., lower than 6 GHz), a corresponding message 1 subcarrier spacing is of 15 kHz or 30 kHz.

In the foregoing, the terminology "being related to" may refer to "being associated with." In another implementation, the terminology "being related to" may be replaced with "being determined" or "being calculated." The TA may be predetermined by the network device and notified to the terminal device, and then the terminal device determines a time gap based on the TA. Alternatively, the TA may be determined by the terminal device based on some parameters (e.g., a TAC and a distance between the network device and the terminal device) indicated by the network device. Alternatively, the network device and the terminal device separately predetermine a TA.

The network device may pre-notify one or more of a message 1 (e.g., random access preamble) format of the terminal device, a subcarrier spacing supported by the message 1, a subcarrier spacing supported by the message 3, a TA/TAC/distance value, and the like, and may perform indication by using one or more of a physical broadcast channel (PBCH), system information (SI), remaining system information (RMSI), a system information block 1 (SIB 1), a system information block 2 (SIB 2), a physical downlink control channel (PDCCH), radio resource control (RRC) signaling, a media access control element (MAC CE), a media access control header (MAC header), a media access control protocol data unit (MAC PDU), a physical downlink shared channel (PDSCH), a random access response (RAR), and downlink control information (DCI).

According to another aspect of the present disclosure, a terminal device determines a TA of the terminal device based on an indication of a network device, further determines a time gap between a message 2 and a message 3, and sends the message 3 to the network device based on the time gap. Correspondingly, the network device may further determine the TA of the terminal device, and receive the message 3 at a corresponding location.

With reference to the solutions in the foregoing aspects, the TA may be determined based on a TAC value indicated by the network device, where the TAC is less than or equal to 3846 and is greater than or equal to a largest TAC in TACs of terminal devices served by the network device.

Further, the indicated TAC value may alternatively be related to a random access preamble format of the terminal device.

Because the TAC is less than 3846, the TA value determined based on the TAC is less than a TA value determined based on 3846. 3846 is a maximum TAC value defined in a protocol.

In addition, with reference to the solutions in the foregoing aspects, the TA may alternatively be determined based on a distance value indicated by the network device, where the distance is less than or equal to 300 km and is greater than or equal to a largest distance in distances of terminal devices served by the network device.

Further, the indicated distance value may alternatively be related to a random access preamble format of the terminal device.

In addition, with reference to the solutions in the foregoing aspects, the terminal device may alternatively use a TA indicated by the network device. To be specific, the network device determines the TA and indicates the TA to the terminal device. The TA is the TA indicated by the network device, and the TA is less than or equal to 2 ms and is greater than or equal to a largest TA in TAs of terminal devices served by the network device.

Further, the TA value may be alternatively related to a random access preamble (namely, a message 1) format of the terminal device.

The terminal device served by the network device may be one or more terminal devices covered by a serving cell of the network device, or may be one or more terminal devices covered by one or more beams of the network device.

With reference to the foregoing methods, the method further includes:

sending, by the network device, indication information to the terminal device, to notify the terminal device of whether the network device uses a beam sweeping manner to receive the random access preamble, where 1 bit may be used for indication in one or more of a PBCH/SI/a SIB 1/a SIB 2/RMSI/Msg2 DCI/a MAC header/a MAC PDU/a PDSCH/a RAR. For example, if the bit is 0, it indicates that the beam sweeping manner is used for receiving; if the bit is 1, it indicates that the beam sweeping manner is not used for receiving. Alternatively, the indication manner may be an independent solution.

With reference to the foregoing methods, the network device may indicate the TAC, TA, or distance value to the terminal device by using one or more of a PBCH/SI/a SIB 1/a SIB 2/RMSI/Msg2 DCI/a MAC header/a MAC PDU/a PDSCH/a RAR.

With reference to the foregoing solutions, the network device may further indicate a TA scale factor to the terminal device by using the foregoing message. The TA scale factor is an integer less than 1. When calculating a final TA, the terminal device needs to multiply a TA by the scale factor.

With reference to the foregoing solutions, the network device may further notify, by using the foregoing message, the terminal device of whether the network device uses the beam sweeping manner to receive the random access preamble.

According to still another aspect of the present disclosure, a network device determines a largest TA in TAs of a plurality of terminal devices in a coverage area of a serving cell or serving beam, and notifies all the terminal devices in the coverage area of the serving cell or serving beam of the largest TA. After receiving the largest TA, each terminal device determines a time gap between a message 2 and a message 3 in a random access process based on the largest TA, and sends the message 3 to the network device based on the determined time gap.

With reference to the foregoing solution, the network device may notify the terminal devices of the largest TA by sending indication information. For example, at least one of DCI, a MAC PDU, or a RAR in the message 2 may be used for indication in the random access process, and the DCI, MAC PDU, or RAR may occupy X bits. When X=4, 16 types of TAs in total may be indicated. The value X may alternatively be another value, for example, 2, 3, 5, or 6.

In the foregoing solution, after receiving messages 1 sent by the terminal devices, the network device determines the largest TA, and notifies the terminal devices in the coverage area of the network device of the largest TA by using the message 2, so that a terminal device that receives the message 2 determines the time gap between the message 2 and the message 3 based on the TA, and sends the message 3 to the network device based on the time gap.

The network device may determine the TAs of the terminal devices based on the received messages 1, select the largest TA in a same manner, calculate the time gap between the message 2 and the message 3 based on the largest TA, and receive, at a corresponding location, the message 3 sent by the terminal device.

In addition, with reference to the foregoing solutions, the TA may alternatively be a TAC or a terminal distance. In addition, a value greater than or equal to a largest TA, TAC, or terminal distance may alternatively be notified. Further, the notified TA, TAC, or terminal distance value may be a specified value greater than the largest value and closest to the largest value. If the network device notifies a specified value of the TAC or the distance, the terminal device first calculates the TA based on the specified value of the TAC or distance, and then further determines the time gap.

In the foregoing solution, each of all the terminal devices calculates the time gap between the message 2 and the message 3 by using the largest TA (or the largest TAC, or the largest distance). In addition, each terminal device may alternatively determine the time gap by using a TA of the terminal device.

The network device determines TAs of terminal devices in the coverage area of the serving cell or serving beam, and notifies the terminal devices in the coverage area of the serving cell or serving beam of the TAs. After receiving the TAs, the terminal devices determine a time gap between a message 2 and a message 3 in a random access process based on the TAs of the terminal devices, and send the message 3 to the network device based on the determined time gap.

With reference to the foregoing solution, the network device may notify corresponding terminal devices of the TAs of the terminal devices by sending indication information. For example, DCI, a MAC PDU, or a RAR in the message 2 may be used for indication in the random access process, and the DCI, MAC PDU, or RAR may occupy X bits. When X=4, 16 types of TAs in total may be indicated. The value X may alternatively be another value, for example, 2, 3, 5, or 6.

Similarly, with reference to the foregoing solutions, the TA may alternatively be a TAC or a terminal distance. In addition, a specified value may alternatively be used, which is similar to the foregoing case, and details are not described again.

The network device may determine the TAs of the terminal devices based on received messages 1, then calculate the time gap between the Msg2 and the Msg3 of each terminal device, and receive, at a corresponding location, the message 3 sent by each terminal device.

With reference to the foregoing solutions, the network device may further indicate a TA scale factor to the terminal device. After determining a TA, the terminal device needs to multiply the TA by the scale factor to obtain a final TA. This solution may alternatively be an independent solution. In addition, the scale factor may alternatively be pre-agreed on by the network device and the terminal device.

The scale factor may be indicated in one or more of a PBCH/SI/a SIB 1/a SIB 2/RMSI/Msg2 DCI/a MAC PDU.

In the foregoing solutions, the network device indicates parameters to be used by the terminal device to determine a TA and further determine a time gap. In this case, the network device also uses these parameters to determine the TA, and further determine the time gap. If the terminal device sends the message 3 at the determined time gap, the network device also receives the message 3 at the time gap.

In addition, corresponding to the foregoing methods, a corresponding apparatus is further disclosed. The apparatus is a terminal device or a network device, or may be a chip or a function module of a terminal device or a network device, and performs a step in a corresponding method. The apparatus may include one or more of the following modules:

a sending module, configured to perform a step of a sending type in the foregoing method;

a receiving module, configured to perform a step of a receiving type in the foregoing method; and a processing module, configured to perform other steps than the steps of sending and receiving in the foregoing method, for example, calculation and determining steps.

The network device and the terminal device in the foregoing solutions have functions of implementing corresponding steps performed by the network device and the terminal device in the foregoing methods. The functions may be implemented by hardware, or may be implemented by hardware that is executing corresponding software. The hardware or the software includes one or more modules corresponding to the foregoing functions. For example, the sending module may be replaced with a transmitter, the receiving module may be replaced with a receiver, and another module such as the processing module may be replaced with a processor, to respectively perform a sending operation, a receiving operation, and a related processing operation in each method embodiment.

In addition, the modules included in the foregoing apparatuses have corresponding functions for implementing the foregoing methods. The functions may be implemented by hardware, or may be implemented by hardware that is executing corresponding software. The hardware or the software includes one or more modules corresponding to the foregoing function. The module may also be referred to as a unit. For example, the parameters (e.g., a TA) mentioned in the foregoing methods are determined or calculated by the processing module, and the indication information is sent or received by the sending module or the receiving module.

In another possible design, the foregoing apparatuses may include a processing unit (module) and a transceiver unit (module). The transceiver unit may include a transmitting unit (module) and a receiving unit (module), which respectively perform corresponding steps of sending and receiving in the foregoing methods. The processing unit performs other steps than the steps of sending and receiving in the foregoing methods. The transceiver unit may be, for example, a transceiver, configured to perform the steps of sending and receiving in the foregoing methods. The transceiver includes a radio frequency circuit, or may include a transmitter and a receiver, which are respectively configured to perform a step of a sending type and a step of a receiving type in the methods. The processing unit may be a processor, configured to perform a step other than the steps of sending and receiving in the foregoing methods. There may be one or more processing units or processors.

Optionally, the apparatus further includes a storage unit (module), and the storage unit may be a memory. When the apparatus includes the storage unit, the storage unit is configured to store a computer-executable instruction, the processing unit is connected to the storage unit, and the processing unit executes the computer-executable instruction stored in the storage unit, so that the apparatus performs the method in any one of the foregoing aspects.

In another possible design, when the apparatus is a chip, the chip may include a processing unit and a transceiver unit. The processing unit may be, for example, a processor, and there may be at least one processor. The transceiver unit may be, for example, an input/output interface, a pin, or a circuit on the chip. The processing unit may execute the computer-executable instruction stored in the storage unit, so that the chip in the terminal performs the delay reduction method in any solution of the first aspect. Optionally, the storage unit may be a storage unit in the chip, such as a register or a buffer, or the storage unit may be a storage unit in the terminal device but outside the chip, such as a read-only memory (ROM), another type of static storage device that can store static information and instruction, or a random access memory (RAM).

The processor mentioned in any one of the foregoing designs may be a general-purpose central processing unit (CPU), a microprocessor, an application-specific integrated circuit (ASIC), or one or more integrated circuits configured to control program execution of the methods.

Still another aspect of this application provides a computer program product including an instruction. When the computer program product runs on a computer, the computer is enabled to perform the method according to the foregoing aspects.

Still another aspect of this application provides a communications chip. The communications chip stores an instruction. When the instruction is run on a network device or a terminal device, the network device or the terminal device is enabled to perform the method in the foregoing aspects.

Still another aspect of this application provides a computer-readable storage medium. The computer-readable storage medium stores an instruction. When the instruction is run on a computer, the computer is enabled to perform the method according to the foregoing aspects.

BRIEF DESCRIPTION OF DRAWINGS

To describe technical solutions in embodiments of this application more clearly, the following briefly describes the accompanying drawings for describing the embodiments or the prior art.

DESCRIPTION OF EMBODIMENTS

Figure 1:
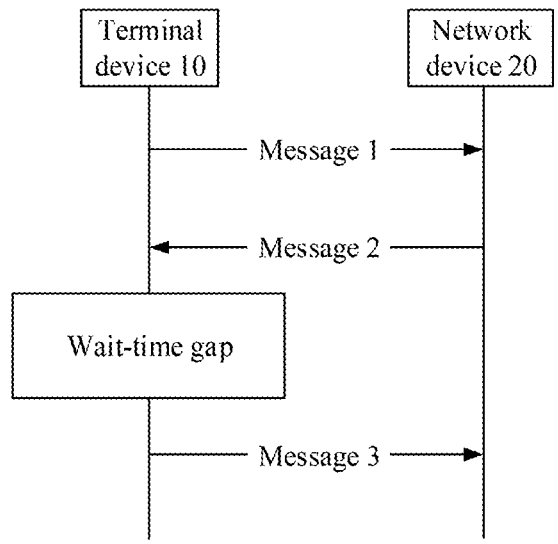
FIG. 1 is a schematic flowchart of a random access process.

A terminal device (terminal for short) in embodiments of this application may be referred to as an access terminal, a subscriber unit, a subscriber station, a mobile station, a remote station, a remote terminal, a mobile device, a user terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal in a 5G network, or the like.

A network device in the embodiments of this application is a network side device that communicates with the terminal device in a wireless manner, for example, a wireless fidelity (Wi-Fi) access point, a base station of next generation communication such as a gNB, a small cell, or a micro cell in 5G, or a transmission reception point (TRP); or may be a relay station, an access point, a vehicle-mounted device, a wearable device, or the like.

In this application, a random access process is described by using a base station as a network device and a terminal as a terminal device.

Step 1: The base station periodically broadcasts a synchronization signal block (SSB) and remaining system information (RMSI), where the RMSI includes random access channel (RACH) configuration information of the base station, and the RACH configuration information includes at least one of a random access preamble (e.g., message 1, Msg1) format, a subcarrier spacing of the message 1, a subcarrier spacing of a message 3, a subcarrier spacing of a message 2, and a subcarrier spacing of a message 4 that are used by the terminal in an access process; and a length of a random access response window (RAR window) used by the terminal to listen to the message 2 further includes association information between the synchronization signal block SSB and a random access channel occasion RACH occasion (RO) corresponding to the synchronization signal block SSB, a configuration periodicity of a physical random access channel (PRACH), and the like.

Step 2: If there are a plurality of SSBs and/or CSI-RSs, the terminal selects an SSB and/or a CSI-RS whose received RSRP reference signal received power (RSRP) is greater than a predefined threshold, determines/selects, on a RO corresponding to the SSB and/or the CSI-RS, the message 1 (namely, a preamble ID) used for random access, and then sends the message 1, namely, a random access preamble, by using a corresponding subcarrier spacing.

Step 3: After detecting, on the RO at a corresponding location, the random access preamble sent by the terminal, the base station may calculate a timing advance (TA) or an equivalent distance value from the terminal to the base station by detecting the random access preamble, and may learn of an ID of the random access preamble detected on the RO.

Step 4: In the RAR window, the base station responds to the received random access preamble, and sends the message 2 to the terminal, where the message 2 includes downlink control information (DCI) carried on a physical downlink control channel (PDCCH) and information carried on a physical downlink shared channel (PDSCH) indicated by the DCI, and the PDSCH includes media access control (MAC) header information and a random access response. If a plurality of terminals send random access preambles on one RO, the base station performs a random access response for the random access preambles of the plurality of terminals in one message 2, that is, the message 2 includes RARs of the plurality of terminals. The information on the PDSCH includes one or more MAC headers and a plurality of possible RARs. The plurality of RARs include a timing advance command (TAC) for each terminal, and the timing advance command may be of 12 bits. The 12 bits indicate a timing advance that should be used by the terminal to send the message 3. In addition, each RAR further includes a UL grant used to schedule the message 3, and the UL grant includes information about a time domain resource and a frequency domain resource that are for sending the message 3.

Step 5: After receiving the message 2, the terminal waits for a time gap, and then sends the message 3 based on the information indicated in the UL grant. The message 3 may carry terminal identification information, to perform conflict resolution in a subsequent message 4.

FIG. 1 illustrates the foregoing steps of message transfer between a terminal device 10 and a network device 20.

Step 6: After receiving the message 3, the base station selects a terminal succeeding in contention, and replies with the message 4.

In step 5, the time gap between the message 2 and the message 3 usually includes N1+N2+L2+TA. Currently, a TA agreed by the 3GPP RAN 1 working group is calculated based on the 12 bits and a maximum value of 3846, and a relatively large delay is caused.

The foregoing messages 1 to 4 are messages 1 to 4 (Msg1 to Msg4) in a random access process. This solution may include some or all of the steps in the random access process, for example, include step 1 to step 3 in the random access process, where the message 1 is the random access preamble, and the message 2 is a random access response. The message 1 includes two parts: a cyclic prefix (CP) and a sequence. For different message 1 formats, there are different cyclic prefix CP lengths and different time-domain sequence lengths. The cyclic prefix is obtained by performing cyclic shift on a sequence. For different message 1 formats, the sequence may be repeated for one or more times. The base station may receive the message 1 in two manners: 1. A beam sweeping manner is used, and different receive beams are used to receive the repeated sequence. 2. The beam sweeping manner is not used, and the base station uses only one receive beam to receive the cyclic prefix CP and the sequence that is repeated for a plurality of times. For the manner in which beam sweeping is not used, it may be considered that, that the sequence is repeated for the plurality of times is equivalent to increasing a length of the cyclic prefix.

At the RAN 1-91 meeting, in 5G NR (new radio), a minimum time gap between the Msg2 and the Msg3 is determined to be duration of N1+duration of N2+L2+TA.

N1 is a time required by the terminal to process and prepare a PDSCH, and is related to a terminal capability and a subcarrier spacing (SCS).

| Subcarrier spacing configuration $\mu$ | PDSCH decoding time $N_1$ [symbols] | |
|---|---|---|
| | No additional PDSCH DM-RS configured | No additional PDSCH DM-RS configured |
| 0 | 8 | 8 |
| 1 | 10 | 10 |
| 2 | 17 | 17 |
| 3 | 20 | 20 |

$\mu$ indicates a subcarrier spacing of $15*2^\mu$ kHz. N1 is based on min($\mu$DL, $\mu$UL), where $\mu$DL is an SCS of a PDSCH, and $\mu$UL is an uplink subcarrier spacing SCS of a HARQ-ACK.

N2 is a time required by the terminal to process and prepare a physical uplink shared channel (PUSCH). In this application, N2 is a time for preparing the message 3 and is related to the terminal capability and the subcarrier spacing. As shown in the following table, a subcarrier spacing is of $15*2^\mu$, and $\mu$ is a subcarrier spacing configuration.

| Subcarrier spacing configuration μ | PUSCH preparation time N₂ [symbols] DM-RS configured |
|---|---|
| 0 | 10 |
| 1 | 12 |
| 2 | 23 |
| 3 | 36 |

μ indicates a subcarrier spacing. N2 is based on min(μDL, μUL), where μDL is a subcarrier spacing SCS of a PDCCH carrying DCI, and μUL is an SCS of a PUSCH.

L2 is a MAC processing delay and is usually fixed to 500 μs.

TA is a maximum delay supported by a 12-bit TAC (Time advance command in a RAR). Maximum TAs corresponding to different uplink subcarrier spacings of the message 3 are shown in the following table.

| Message 3 subcarrier spacing | Unit | Maximum TA (ms) |
|---|---|---|
| 15 kHz | 16 * 64 * Ts | 2 |
| 30 kHz | 8 * 64 * Ts | 1 |
| 60 kHz | 4 * 64 * Ts | 0.5 |
| 120 kHz | 2 * 64 * Ts | 0.25 |

In RAN 1, it is agreed that a maximum value indicated by the 12-bit TAC is 3846, which is applicable to a scenario in which a cell coverage radius is 300 km. However, in a current RACH process, a cell radius that can be supported by the message 1 (e.g., random access preamble, preamble) is far less than 300 km. Cell radiuses supported by different preamble formats for long sequences in NR are shown in the following table, where k=64.

| Preamble format | Sequence length $L_{RA}$ | Subcarrier spacing format $\Delta f^{RA}$ | Time-domain sequence length $N_u$ | Cyclic prefix $N_{CP}^{RA}$ | Cell radius (m) |
|---|---|---|---|---|---|
| 0 | 839 | 1.25 kHz | 24576 κ | 3168 κ | 15468.75 |
| 1 | 839 | 1.25 kHz | 2 · 24576κ | 21024κ | 102656.3 |
| 2 | 839 | 1.25 kHz | 4 · 24576κ | 4688 κ | 22890.63 |
| 3 | 839 | 5 kHz | 4 · 6144 κ | 3168 κ | 15468.75 |

When an SCS is of 15 kHz, cell radiuses supported by different preamble formats for short sequences are shown in the following table.

| Preamble format | | Time length of a cyclic prefix TCP | Time length of a time-domain sequence TSEQ | Time length of a guard period TGP | Path profile | Cell radius (m) |
|---|---|---|---|---|---|---|
| A | 1 | 288 | 4096 | 0 | 96 | 938 |
|   | 2 | 576 | 8192 | 0 | 144 | 2,109 |
|   | 3 | 864 | 12288 | 0 | 144 | 3,516 |
| B | 1 | 216 | 4096 | 72 | 96 | 469 |
|   | 2 | 360 | 8192 | 216 | 144 | 1,055 |
|   | 3 | 504 | 12288 | 360 | 144 | 1,758 |
|   | 4 | 936 | 24576 | 792 | 144 | 3,867 |
| C | 0 | 1240 | 2048 | 1096 | 144 | 5300 |
|   | 2 | 2048 | 8192 | 2916 | 144 | 9200 |

As shown in the preceding two tables, a cell radius corresponding to each random access preamble is far less than 300 km regardless of whether a sequence is the long sequence or the short sequence. Therefore, the TA corresponding to 12 bit-3846 is relatively large, and using the TA increases an unnecessary delay between the Msg2 and the Msg3.

In this application, the TA between the Msg2 and the Msg3 is reduced in a RACH process, so that a gap between the Msg2 and the Msg3 is reduced, and RACH efficiency is improved.

In this application, a case of the long sequence and a case of the short sequence are used for illustration.

I. For a long-sequence random access preamble format, the long sequence is usually a sequence whose random access preamble sequence length is 839, and the following three methods may be used:

1. Depending on whether a beam sweeping manner is used for receiving a random access preamble by the base station The base station may indicate, to the terminal on a physical broadcast channel (PBCH)/in system information (SI)/in a system information block 1 (SIB 1)/in a system information block 2 (SIB 2)/in RMSI/in Msg2 DCI/in an Msg2 MAC header/in an Msg2 RAR, whether the base station uses a beam sweeping manner to receive a random access preamble in a receiving process. For example, 1 bit is used for indication. If the indication bit is 0, it indicates that the beam sweeping manner is used for receiving. If the bit is 1, it indicates that the base station does not use the beam sweeping manner for receiving. Alternatively, the base station does not explicitly indicate a receiving manner, and the base station and the terminal defaults/predefines a random access preamble receiving manner. The terminal determines one or more of a corresponding TA value, a corresponding quantity of OFDM symbols, and a corresponding TAC value based on the indication of the base station for the message 1 receiving manner and based on a corresponding message 1 (e.g., random access preamble) format, and calculates a time gap (gap) between the message 2 and the message 3 accordingly. Descriptions are provided below based on two cases:

1.1 If the base station notifies the terminal that the base station uses the beam sweeping manner to receive the random access preamble sent by the terminal In an implementation, a maximum TA is determined by a maximum cell radius (or a maximum coverage area/distance) supported by the message 1 (namely, the random access preamble), and is determined according to a formula:

Maximum $TA=2*Radius/c$.

Radius indicates a cell radius or coverage area/distance supported by the random access preamble, and c indicates a speed of light.

In this application, four formats of the long sequence that are defined in the standard are as follows:

| Preamble format | Sequence length $L^{RA}$ | Subcarrier spacing $\Delta f^{RA}$ | Time-domain sequence length $N_u$ | Cyclic prefix $N_{CP}^{RA}$ | Support for restricted sets |
|---|---|---|---|---|---|
| 0 | 839 | 1.25 kHz | 24576 | 3168 | Type A, Type B |
| 1 | 839 | 1.25 kHz | 2*24576 | 21024 | Type A, Type B |
| 2 | 839 | 1.25 kHz | 4*24576 | 4688 | Type A, Type B |
| 3 | 839 | 5 kHz | 4*6144 | 3168 | Type A, Type B |

For each sequence format, a supported cell radius is as follows:

$$\text{Radius} = N_{CP}^{RA} * T_s * c / 2.$$

In the foregoing formula, $T_s = 1/3072000$, $N_{CP}^{RA}$ is a cyclic prefix length, $\Delta f^{RA}$ is a subcarrier spacing size, and $N_u$ is a sequence length.

Usually, all terminals covered by one serving cell of the base station or one beam use a same random access preamble format.

According to the foregoing formula, the cell radius and the maximum TA that correspond to each random access preamble in a long sequence format are calculated, as shown in the following table.

| Preamble format | Cell radius (m) | Maximum TA (μs) | PUSCH 15 kHz [Symbols] | PUSCH 30 kHz [Symbols] |
|---|---|---|---|---|
| 0 | 15468.75 | 104 | 2 | 3 |
| 1 | 102656.3 | 685 | 10 | 20 |
| 2 | 22890.63 | 153 | 3 | 5 |
| 3 | 15468.75 | 104 | 2 | 3 |

Alternatively, in another representation manner, the maximum TA and L2=500 μs are converted together into a quantity of symbols, as shown in the following table.

| Preamble format | Cell radius (m) | L2 + Maximum TA (με) | PUSCH 15 kHz [Symbols] | PUSCH 30 kHz [Symbols] |
|---|---|---|---|---|
| 0 | 15468.75 | 500 + 104 | 9 | 17 |
| 1 | 102656.3 | 500 + 685 | 17 | 34 |
| 2 | 22890.63 | 500 + 153 | 10 | 19 |
| 3 | 15468.75 | 500 + 104 | 9 | 17 |

Symbol = ceil((L2+maximum TA)/symbol duration). For a symbol having the subcarrier spacing of 15 kHz, symbol duration=1/14 ms. For a symbol having the subcarrier spacing of 30 kHz, symbol duration=0.5/14 ms.

Alternatively, when subcarrier spacings corresponding to N1 and N2 are the same, the maximum TA is superimposed with L2, N1, and N2, to be converted into a quantity of symbols, as shown in the following two tables, where a message 1 subcarrier spacing is of $15*2^\mu$ kHz.

| Message 1 subcarrier | N1 + N2 [symbols] | |
|---|---|---|
| | No additional PDSCH DM-RS | No additional PDSCH DM-RS |
| 0 | 8 + 10 = 18 | 8 + 10 = 18 |
| 1 | 10 + 12 = 22 | 10 + 12 = 22 |

| Message 1 subcarrier spacing μ | Cell radius (m) | Maximum TA (μs) | PUSCH 15 kHz [Symbols] | | PUSCH 30 kHz [Symbols] | |
|---|---|---|---|---|---|---|
| | | | No additional PDSCH DMRS | Additional PDSCH DM-RS | No additional PDSCH DMRS | Additional PDSCH DM-RS |
| 0 | 15468.75 | 104 | 9 + 18 = 27 | 9 + 23 = 32 | 15468.75 | 104 |
| 1 | 102656.3 | 685 | 17 + 18 = 35 | 17 + 23 = 40 | 102656.3 | 685 |

The last two columns in the table indicate quantities of OFDM symbols that are equivalent to the maximum TA. Subcarrier spacings of the symbols are respectively of 15 kHz and 30 kHz. A calculation formula is as follows:

Symbol quantity=ceil(maximum TA/symbol duration).

In the foregoing formula, ceil indicates a round-up function. For a symbol having the subcarrier spacing of 15 kHz, symbol duration=1/14 ms. For a symbol having the subcarrier spacing of 30 kHz, symbol duration=0.5/14 ms. The round-up function herein may also be replaced with a round-down function floor.

In conclusion, in the foregoing solution, cell radiuses corresponding to random access preambles in various formats are far less than 300 km. Therefore, TAs calculated based on the cell radiuses are far less than a TA calculated based on the cell radius of 300 km.

1.2 If the base station notifies the terminal that the base station does not use the beam sweeping manner to receive the random access preamble sent by the terminal If the base station does not use the beam sweeping manner to receive the random access preamble, for the long sequence, a repeated sequence other than a valid sequence of the long sequence may be used as an additional random access preamble. An increased random access preamble length can increase a cell coverage radius/distance.

For example, for the long sequence, an equivalent random access preamble length and a corresponding cell coverage radius/distance are shown in the following table:

| Preamble format | Sequence length $N_u$ | Cyclic prefix $N_{CP}^{RA}$ | Equivalent CP length | Maximum cell radius that is supported Radius (m) | Maximum TA max-TA (µs) |
|---|---|---|---|---|---|
| 0 | 24576 | 3168 | 27744 | 15468.75 | 104 |
| 1 | 2 * 24576 | 21024 | 45600 | 222656.3 | 1485 |
| 2 | 4 * 24576 | 4688 | 53840 | 382890.6 | 2000 |
| 3 | 4 * 6144 | 3168 | 21600 | 105468.8 | 704 |

A calculation formula is: Radius=equivalent CP length*Ts*c/2. The equivalent CP length is obtained by subtracting the repeated sequence from a sum of $N_{CP}^{RA}$ and $N_u$. For example, for a format 1, the equivalent CP length is 21024+24576. For a format 2, the equivalent CP length is 4688+(4−1)*24576. For a format 3, the equivalent CP length is 3168+(4−1)*6144.

Maximum $TA = 2*Radius/c$.

In an equivalent representation manner, the maximum TA is equivalently converted into quantities of OFDM symbols at different subcarrier spacings, or is converted into quantities of OFDM symbols at different subcarrier spacings together with L2=500 µs. In a conversion process, to obtain an integer quantity of OFDM symbols, a result may be rounded up/down. A conversion manner is similar to that in the foregoing centralized case, and details are not described again.

Therefore, similar to the case in 1.1, cell radiuses corresponding to random access preambles in various formats are far less than 300 km. Therefore, TAs calculated based on the cell radiuses are far less than a TA calculated based on the cell radius of 300 km.

In conclusion, for a long-sequence random access preamble format, a TA is associated with the random access preamble format. The base station or the terminal may determine the TA based on a random access preamble of the terminal and a maximum cell radius that is supported by the random access preamble, and determine a time gap between the message 2 and the message 3 based on the TA. After receiving the message 2 sent by the base station, the terminal may send the message 3 to the base station based on the time gap. The base station receives, at a corresponding location based on the time gap, the message 3 sent by the terminal. If the base station uses the beam sweeping manner to receive the random access preamble of the terminal, the maximum cell radius supported by the random access preamble is determined by a cyclic prefix $N_{CP}^{RA}$ corresponding to the random access preamble. If the base station does not use the beam sweeping manner to receive the random access preamble of the terminal, the maximum cell radius supported by the random access preamble is determined by the cyclic prefix $N_{CP}^{RA}$ and $N_u$ that correspond to the random access preamble.

2. The TA is calculated based on a TAC indicated by the base station. The TAC is less than 3846.

A maximum value indicated by the TAC is 3846. This value is applicable to a scenario in which a cell coverage radius is 300 km. An actual cell radius is far less than 300 km. Therefore, a TA value can be reduced if the TA is determined based on a TAC value less than 3846. The TA and the TAC may be converted according to the prior art, and details are not described herein again.

In an embodiment, the base station indicates a TAC to be used to the terminal. There may be a plurality of candidate TAC values. For example, when there are two TAC candidate values, which are 3846 and 1282, the base station indicates, to the terminal by using 1 bit, a value that should be used to calculate the maximum TA. Alternatively, there are four candidate values, for example, 3846, 1923, 961, and 480. The base station indicates, to the terminal by using 2 bits, a value that should be used to calculate the maximum TA. A quantity X of indicated candidate values and a specific value are not limited herein, provided that the value is less than or equal to 3846. The base station uses ceil(log2(X)) for indication, where ceil represents rounding up.

The base station may learn of a distance, a TAC value, or a TA value of each terminal through a message 1 of each terminal. The TAC is used as an example. A largest TAC value in TAC values of terminals is used, and a TAC value less than or equal to 3846 and greater than or equal to the largest value is determined.

In another embodiment, after determining a TAC value less than or equal to 3846 and greater than or equal to the largest value, the base station may convert the TAC value into a TA value, and indicate a TA to the terminal for using. In addition, a plurality of candidate TA values may alternatively be determined, for example, two, four, six, or eight candidate TA values. This is similar to the foregoing case.

A specific manner of indicating by the base station includes using ceil(log2(X)) bits for indication on a PBCH/in SI/in a SIB 1/in a SIB 2/in RMSI/in Msg2 DCI/in a MAC header/in a MAC PDU/on a PDSCH/in a RAR. A TA or TAC value selected by the base station should be greater than or equal to a largest TA or TAC in TAs or TACs of all terminals. For example, a smallest value is selected from values that are greater than "the largest TA or TAC" and that are in candidate TA or TAC values.

The base station may learn of TAs or TACs of a plurality of terminals through a message 1, obtain a largest value, and then specify a value of an actual TA or TAC for the terminals. The value of the actual TA or TAC needs to be greater than or equal to the largest value.

For example, when there are only two candidate values, the base station uses 1 bit for indication, and may use an indication bit Msg1-scs of a message 1 subcarrier spacing. This bit is not used for a long-sequence random access preamble format, and is still used to indicate a message 1 subcarrier spacing for a short-sequence random access preamble format.

In the foregoing solution, after receiving a TAC value indicated by the base station, the terminal determines a TA value based on the TAC value and an Msg3 subcarrier spacing. A determining manner is multiplying the TAC value by a unit. The unit is related to the Msg3 subcarrier spacing, as shown in the following table.

| Message 3 subcarrier spacing | Unit |
| --- | --- |
| 15 kHz | 16 * 64 * Ts |
| 30 kHz | 8 * 64 * Ts |
| 60 kHz | 4 * 64 * Ts |
| 120 kHz | 2 * 64 * Ts |

Herein, Ts=1/(64*30.72*10^6) seconds.

In the foregoing solution, random access preambles in different sequence formats all use a same TAC or TA. In another optional manner, there are different candidate TACs or TA values for different sequence formats. The following table uses a TAC as an example.

| Preamble format | Larger TAC value | Smaller TAC value |
| --- | --- | --- |
| 0 | 200 | 100 |
| 1 | 2856 | 1318 |
| 2 | 3846 | 295 |
| 3 | 1354 | 200 |

In the foregoing table, two TAC values in each sequence format are merely examples. Alternatively, there may be four, six, eight, or the like TAC values. Each sequence corresponds to one group of TACs. The base station sends a TAC corresponding to a random access preamble sequence to the terminal, and the terminal may determine a TA value based on the TAC and the Msg3 subcarrier spacing. For example, a random access preamble format is 1. If determining that a largest TAC in TACs of the plurality of terminals is 2800, the base station may send a larger value 2856 to the terminal; if a largest TAC is 1200, the base station sends a smaller value 1318 to the terminal. That is, a TAC sent by the base station to the terminal may be greater than a determined largest TAC and close to the largest TAC.

The base station may indicate the TAC to the terminal, and the terminal determines a TA based on the TAC. Alternatively, the base station may directly obtain a TA through calculation based on the TAC, and indicate the TA to the terminal. The base station sends indication information to one or more terminals or all terminals within a cell or beam service area. The foregoing solution is also applicable to a short-sequence random access preamble format.

In the foregoing solution, the base station determines a largest value in TAC values of a plurality of terminals within a serving cell or serving beam coverage area, and notifies each terminal of a set TAC value, where the set TAC value is greater than or equal to the largest value. Further, the set TAC value may be close to the largest value, and may further be related to a preamble format. A terminal that receives the set TAC value may determine a value of the TA based on the set TAC, and further determine a time gap between a message 2 and a message 3. In addition, the TAC may alternatively be a TA. A difference lies in that the base station determines the TA and notifies the terminal of the TA. A method of other operations on the TA is similar to that of the TAC, and details are not described herein again.

3. The TA is determined based on a distance value indicated by the base station to the terminal, where the distance value is less than 300 km.

In another embodiment, the base station indicates a distance value (e.g., a distance between the base station and the terminal) to be used to the terminal. The terminal determines a TA based on the distance. There may be a plurality of candidate distance values, random access preamble formats may not be distinguished, and a same distance value is used. Alternatively, different distances may be used for different random access preambles. For example, when there are two candidate values, distance values corresponding to sequence formats are shown in the following table:

| Preamble format | Farther distance (km) | Closer distance (km) |
| --- | --- | --- |
| 0 | 20 | 10 |
| 1 | 200 | 100 |
| 2 | 300 | 100 |
| 3 | 100 | 10 |

Alternatively, there may be four, six, eight, or the like candidate distance values.

The base station may learn of distances of a plurality of terminals in advance through, for example, a message 1, obtain a largest value of the plurality of distances, then determine that a distance for calculating the TA needs to be greater than or equal to the largest value of the plurality of distances, and then notify the terminal. For example, a random access preamble format is 1. If the largest distance in the distances of the plurality of terminals is 90, a smaller distance 100 in the preceding table may be used. If the largest value in the distances of the plurality of terminals is 160, 200 needs to be used. That is, a value greater than and closest to the largest value may be used.

A quantity X of indicated candidate distance values and a specific value are not limited herein, provided that the value is less than or equal to 300. The base station uses ceil(log2 (X)) for indication, where ceil represents rounding up.

A specific manner of indicating by the base station includes using ceil(log2(X)) bits for indication on a PBCH/in SI/in a SIB 1/in a SIB 2/in RMSI/in Msg2 DCI/in a MAC header/in a MAC PDU/on a PDSCH/in a RAR. A distance selected by the base station should be greater than or equal to a distance of a farthest terminal served by a cell.

In the foregoing solution, the base station determines a largest distance in distances of a plurality of terminals within a serving cell or serving beam coverage area, and notifies each terminal of a set distance, where the set distance is greater than or equal to the largest distance. Further, the set distance may be close to the largest value, and may further be related to a preamble format. A terminal that receives the set distance may determine a value of the TA based on the set distance, and further determine a time gap between a message 2 and a message 3.

II. For a short-sequence random access preamble format, the short sequence is usually a sequence whose random access preamble sequence length is 139, and the following three methods may be used:

1. Depending on whether a beam sweeping manner is used for receiving a random access preamble by the base station.

The base station may indicate, to the terminal on a PBCH/in SI/in a SIB 1/in a SIB 2/in RMSI/in Msg2 DCI/in an Msg2 MAC header/in an Msg2 RAR, whether the base station uses a beam sweeping manner to receive a random access preamble in a receiving process. For example, 1 bit is used for indication. If the indication bit is 0, it indicates that the beam sweeping manner is used for receiving. If the bit is 1, it indicates that the base station does not use the beam sweeping manner for receiving. The terminal determines one or more of a corresponding TA value, a corresponding quantity of OFDM symbols, and a corresponding TAC value based on the indication of the base station for the message 1 (random access preamble) receiving manner and based on a corresponding message 1 format, and calculates a time gap (gap) between the message 2 and the message 3 accordingly. Herein, the method is similar to that of the long-sequence random access preamble format, and details are not described again.

1.1 The base station uses a beam sweeping manner to receive the message 1.

When the beam sweeping manner is used to receive the message 1, cyclic prefixes and time-domain sequence lengths corresponding to different sequence formats are shown in the following table:

| Preamble format | | Quantity of OFDM symbols | Time length of a cyclic prefix TCP | Time length of a time-domain sequence TSEQ | Time length of a guard period TGP | Path profile (Ts) |
|---|---|---|---|---|---|---|
| A | 1 | 2 | 288 | 4096 | 0 | 96 |
|   | 2 | 4 | 576 | 8192 | 0 | 144 |
|   | 3 | 6 | 864 | 12288 | 0 | 144 |
| B | 1 | 2 | 216 | 4096 | 72 | 96 |
|   | 2 | 4 | 360 | 8192 | 216 | 144 |
|   | 3 | 6 | 504 | 12288 | 360 | 144 |
|   | 4 | 12 | 936 | 24576 | 792 | 144 |
| C | 0 | 1 | 1240 | 2048 | 1096 | 144 |
|   | 2 | 4 | 2048 | 8192 | 2916 | 144 |

Cell radiuses/coverage distances supported by different sequences can be obtained by using the following formula:

$$Radius = (TCP - \text{Path profile}) * Ts * c / 2.$$

TCP and Path profile are obtained from the preceding table, and c is a speed of light. When a message 1 subcarrier spacing is of 15 kHz, $Ts = 1/(30.72*10^6)$;

when a message 1 subcarrier spacing is of 30 kHz, $Ts = 1/(2*30.72*10^6)$;

when a message 1 subcarrier spacing is of 60 kHz, $Ts = 1/(4*30.72*10^6)$; or when a message 1 subcarrier spacing is of 120 kHz, $Ts = 1/(8*30.72*10^6)$.

There may alternatively be another subcarrier spacing value. This is not limited in this application.

Therefore, a plurality of radiuses may be obtained for each short-sequence random access preamble format, and respectively correspond to different message 1 subcarrier spacings. TAs corresponding to maximum cell radiuses supported by different sequences are calculated according to the following formula:

$$\text{Maximum } TA = 2 * Radius / c.$$

Results are shown in the following table.

| Preamble format | | Maximum TA (μs) | | | |
|---|---|---|---|---|---|
| | | Message 1 subcarrier spacing format Msg1-15 kHz | Message 1 subcarrier spacing format Msg1-30 kHz | Message 1 subcarrier spacing format Msg1-60 kHz | Message 1 subcarrier spacing format Msg1-120 kHz |
| A | 1 | 7 | 4 | 2 | 1 |
|   | 2 | 15 | 7.5 | 3.75 | 1.875 |
|   | 3 | 24 | 12 | 6 | 3 |
| B | 1 | 4 | 2 | 1 | 0.5 |
|   | 2 | 8 | 4 | 2 | 1 |
|   | 3 | 12 | 6 | 3 | 1.5 |
|   | 4 | 26 | 13 | 6.5 | 3.25 |
| C | 0 | 36 | 18 | 9 | 4.5 |
|   | 2 | 62 | 31 | 15.5 | 7.75 |

It can be learned from the foregoing solution that for random access preambles (message 1) in a same format, for different subcarrier spacings, if Ts is different, supported cell radiuses are different, and therefore, different TAs may be obtained. Four columns of TAs obtained in the foregoing table respectively correspond to 15 kHz, 30 kHz, 60 kHz, and 120 kHz.

In an example, the terminal may determine a corresponding TA based on a base station indication (a message 1 format and a message 1 subcarrier spacing), and a used message 1 format and subcarrier spacing. In other words, a fixed TA value may be obtained based on a preamble type and an Msg1 value in the foregoing table. The indication may be delivered by using one or more of a PBCH/SI/a SIB 1/a SIB 2/RMSI/a PDCCH/Msg2 DCI/a MAC header/a MAC PDU/a PDSCH/a RAR.

In addition, for each message 1 format, TAs corresponding to 15 kHz may alternatively be used. That is, a column of TA values corresponding to Msg1-15 kHz are used, and a corresponding TA is selected from the column corresponding to Msg1-15 kHz based on different preamble formats.

Alternatively, a TA corresponding to 15 kHz or 60 kHz is used based on classification of FR1 (0 GHz to 6 GHz, low frequency) and FR2 (more than 6 GHz). To be specific, if the terminal is on a low frequency (a corresponding subcarrier spacing is of 15 kHz or 30 kHz), the column of TAs corresponding to Msg1-15 kHz is used, and a TA is selected from the column of TAs based on a preamble format. If the terminal is on a high frequency (a corresponding subcarrier spacing is of 60 kHz and 120 kHz), the column of TAs corresponding to Msg1-60 kHz is used, and a TA is selected from the column of TAs based on a preamble format.

Therefore, in the foregoing solution, the base station or the terminal may determine a TA based on a random access preamble of the terminal and a subcarrier spacing corresponding to the random access preamble, and terminals use different TAs. Alternatively, all terminals may use a TA corresponding to a minimum subcarrier spacing. Alternatively, each terminal uses, based on a frequency range (a low frequency or a high frequency) of the terminal, a TA corresponding to a relatively small subcarrier spacing of a preamble corresponding to the frequency range.

1.2 The base station does not use a beam sweeping manner to receive the message 1.

For the base station not using the beam sweeping manner to receive the message 1, in the following table:

| Preamble format | | Quantity of OFDM symbols | Time length of a cyclic prefix TCP | Time length of a time-domain sequence TSEQ | Time length of a guard period TGP | Path profile (Ts) |
|---|---|---|---|---|---|---|
| A | 1 | 2 | 288 | 4096 | 0 | 96 |
|   | 2 | 4 | 576 | 8192 | 0 | 144 |
|   | 3 | 6 | 864 | 12288 | 0 | 144 |
| B | 1 | 2 | 216 | 4096 | 72 | 96 |
|   | 2 | 4 | 360 | 8192 | 216 | 144 |
|   | 3 | 6 | 504 | 12288 | 360 | 144 |
|   | 4 | 12 | 936 | 24576 | 792 | 144 |
| C | 0 | 1 | 1240 | 2048 | 1096 | 144 |
|   | 2 | 4 | 2048 | 8192 | 2916 | 144 |

All other valid time-domain sequence lengths except 2048 valid time-domain sequence lengths in the TSEQ may be used as a cyclic prefix CP, which is referred to as an extended cyclic prefix ECP herein:

$$ECP = TCP + TSEQ - 2048.$$

A maximum cell radius/coverage distance supported by each message format is calculated based on the extended CP:

$$Radius = (ECP - \text{Path profile}) * Ts * c / 2.$$

Path profile is obtained from the table, and c is a speed of light. When a message 1 subcarrier spacing is of 15 kHz, $Ts = 1/(30.72*10^6)$; when a message 1 subcarrier spacing is of 30 kHz, $Ts = 1/(2*30.72*10^6)$; when a message 1 subcarrier spacing is of 60 kHz, $Ts = 1/(4*30.72*10^6)$; or when a message 1 subcarrier spacing is of 120 kHz, $Ts = 1/(8*30.72*10^6)$.

According to a formula:

$$\text{Maximum } TA = 2 * Radius / c,$$

where maximum TAs corresponding to different message 1 formats on different subcarriers are determined, as shown in the following table:

| Preamble format | | Time length of a cyclic prefix TCP | Time length of a time-domain sequence TSEQ | Time length of a guard period TGP | Path profile | Message 1 subcarrier spacing Msg1-15 kHz (μs) | Message 1 subcarrier spacing Msg1-30 kHz (μs) | Message 1 subcarrier spacing Msg1-60 kHz (μs) | Message 1 subcarrier spacing Msg1-120 kHz (μs) |
|---|---|---|---|---|---|---|---|---|---|
| A | 1 | 288 | 4096 | 0 | 96 | 73 | 37 | 19 | 10 |
|   | 2 | 576 | 8192 | 0 | 144 | 215 | 108 | 54 | 27 |
|   | 3 | 864 | 12288 | 0 | 144 | 357 | 179 | 90 | 45 |
| B | 1 | 216 | 4096 | 72 | 96 | 71 | 36 | 18 | 9 |
|   | 2 | 360 | 8192 | 216 | 144 | 208 | 104 | 52 | 26 |
|   | 3 | 504 | 12288 | 360 | 144 | 346 | 173 | 87 | 44 |
|   | 4 | 936 | 24576 | 792 | 144 | 760 | 380 | 190 | 95 |
| C | 0 | 1240 | 2048 | 1096 | 144 | 36 | 18 | 9 | 5 |
|   | 2 | 2048 | 8192 | 2916 | 144 | 262 | 131 | 66 | 33 |

It can be learned from the foregoing solution that, similar to that in the case 1.1, for random access preambles (e.g., message 1) in a same format, for different subcarrier spacings, if Ts is different, supported cell radiuses are different, and therefore, different TAs may be obtained. However, calculation manners are slightly different. Four columns of TAs obtained in the foregoing table respectively correspond to 15 kHz, 30 kHz, 60 kHz, and 120 kHz.

A method of selecting a TA is the same as that in 1.1. The terminal may determine a corresponding TA based on a preamble format and a used message 1 subcarrier spacing. In addition, for each message 1 format, a TA corresponding to 15 kHz may be fixedly used, or a TA corresponding to 15 kHz or 60 kHz is fixedly used based on classification of FR1 and FR2, and then a gap between a message 2 and a message 3 is calculated. This is similar to the foregoing case, and details are not described herein again.

In conclusion, the TA is determined based on a type of the random access preamble and a subcarrier spacing corresponding to the random access preamble, and terminals may use different TAs. Alternatively, all terminals may use a TA corresponding to a minimum subcarrier spacing. Alternatively, each terminal uses, based on a frequency range of the terminal, a TA corresponding to a relatively small message 1 subcarrier spacing within the frequency range.

2. A TA is determined based on a TA value or a TAC value indicated by the base station to the terminal.

The base station directly indicates a TA value to the terminal, and the terminal determines a time gap between a message 2 and a message 3 based on the TA. Alternatively, the base station indicates a TAC value to the terminal, and the terminal determines a corresponding TA value based on a message 1 format, a message 3 subcarrier spacing, and the TAC value.

For example, the base station directly indicates a TA value or a TA index value of the terminal.

The TA value indicated by the base station should be greater than or equal to a largest TA value in TA values of all terminals covered by a cell/beam. For example, 4 bits may be used for indication, and an indicated candidate value is selected from the following table:

| Index index | TA (μs) | Index index | TA (μs) |
|---|---|---|---|
| 0 | 9 | 8 | 125 |
| 1 | 18 | 9 | 250 |
| 2 | 27 | 10 | 375 |
| 3 | 36 | 11 | 500 |
| 4 | 45 | 12 | 750 |
| 5 | 54 | 13 | 1000 |
| 6 | 63 | 14 | 1500 |
| 7 | 72 | 15 | 2000 |

In this application, a quantity of indicated candidate TAs/indexes and a quantity of bits used for indication are not limited, and an indicated TA value should be less than or equal to 2 ms, to reduce a time gap between a message 2 and a message 3.

For another example, the base station directly indicates a TAC value/index to the terminal. The TAC value indicated by the base station should be greater than or equal to a largest TAC value in TAC values in a RAR of one or more terminals within cell/beam coverage. For example, 2 bits are used to indicate the following TAC values:

| Index | TAC value | Index | TAC value |
|---|---|---|---|
| 0 | 480 | 1 | 961 |
| 2 | 1923 | 3 | 3846 |

In this application, a quantity of indicated candidate TACs/indexes and a quantity of bits used for indication are not limited, and an indicated TAC value should be less than or equal to 3846, to reduce a time gap between a message 2 and a message 3.

Further, the indicated TAC or TA may be closest to a largest TAC or TA of one or more terminals within cell/beam coverage.

After receiving an index, the terminal determines the maximum TA based on the subcarrier spacing of the message 3. A calculation formula is as follows:

Maximum TA=TAC*unit.

The value unit is related to the subcarrier spacing of the message 3, and a relationship is shown in the following table, where $Ts=1/(64*30.72*10^6)$ seconds.

| Message 3 subcarrier spacing | Unit |
|---|---|
| 15 kHz | 16 * 64 * Ts |
| 30 kHz | 8 * 64 * Ts |
| 60 kHz | 4 * 64 * Ts |
| 120 kHz | 2 * 64 * Ts |

For another example, the base station uses 1 bit to indicate two types of candidate TAC values corresponding to different message 1 formats, as shown in the following table:

| Preamble format | | Time length of a cyclic prefix TCP | Time length of a time-domain sequence TSEQ | Time length of a guard period TGP | Path profile | Larger TAC value TAC-A | Smaller TAC value TAC-B |
|---|---|---|---|---|---|---|---|
| A | 1 | 288 | 4096 | 0 | 96 | 145 | 13 |
|   | 2 | 576 | 8192 | 0 | 144 | 435 | 39 |
|   | 3 | 864 | 12288 | 0 | 144 | 711 | 52 |
| B | 1 | 216 | 4096 | 72 | 96 | 145 | 13 |
|   | 2 | 360 | 8192 | 216 | 144 | 421 | 26 |
|   | 3 | 504 | 12288 | 360 | 144 | 684 | 26 |
|   | 4 | 936 | 24576 | 792 | 144 | 1500 | 52 |
| C | 0 | 1240 | 2048 | 1096 | 144 | 79 | 77 |
|   | 2 | 2048 | 8192 | 2916 | 144 | 527 | 129 |

In this application, for a specific TAC value, the quantity of candidate TACs, and the quantity of bits used for indication are not limited, provided that a constraint distance is less than 3846. A manner of indicating by the base station includes performing indication on a PBCH/in SI/in a SIB 1/in a SIB 2/in RMSI/in Msg2 DCI/in an Msg2 MAC header/in an Msg2 RAR. After receiving a TAC, the terminal determines a maximum TA based on the subcarrier spacing of the message 3. A calculation formula is as follows:

Maximum $TA = TAC * \text{unit}$.

The value unit is related to the subcarrier spacing of the message 3, and a relationship is shown in the following table, where $Ts = 1/(64*30.72*10^6)$ seconds.

| Message 3 subcarrier spacing | Unit |
|---|---|
| 15 kHz | 16 * 64 * Ts |
| 30 kHz | 8 * 64 * Ts |
| 60 kHz | 4 * 64 * Ts |
| 120 kHz | 2 * 64 * Ts |

For another example, 1 bit is used to indicate two types of TA values corresponding to different message 1 formats, as shown in the following table:

| Preamble format | | Time length of a cyclic prefix TCP | Time length of a time-domain sequence TSEQ | Time length of a guard period TGP | Path profile | Larger value TA-A (μs) | Smaller value TA-B (μs) |
|---|---|---|---|---|---|---|---|
| A | 1 | 288 | 4096 | 0 | 96 | 74 | 7 |
|   | 2 | 576 | 8192 | 0 | 144 | 220 | 20 |
|   | 3 | 864 | 12288 | 0 | 144 | 360 | 27 |
| B | 1 | 216 | 4096 | 72 | 96 | 74 | 7 |
|   | 2 | 360 | 8192 | 216 | 144 | 214 | 14 |
|   | 3 | 504 | 12288 | 360 | 144 | 347 | 14 |
|   | 4 | 936 | 24576 | 792 | 144 | 760 | 27 |
| C | 0 | 1240 | 2048 | 1096 | 144 | 40 | 40 |
|   | 2 | 2048 | 8192 | 2916 | 144 | 267 | 67 |

In this application, for a specific TAC value, the quantity of candidate TACs, and the quantity of bits used for indication are not limited, provided that a constraint TA is less than 2 ms. A manner of indicating by the base station includes performing indication on a PBCH/in SI/in a SIB 1/in a SIB 2/in RMSI/in Msg2 DCI/in an Msg2 MAC header/in an Msg2 RAR.

A specific manner of indicating by the base station includes using ceil(log2(X)) bits for indication on a PBCH/in SI/in a SIB 1/in a SIB 2/in RMSI/in Msg2 DCI/in an Msg2 MAC header/in an Msg2 RAR, where ceil represents rounding up. X indicates a quantity of candidate TAs or TACs. The foregoing method is also applicable to a long-sequence random access preamble format.

3. A TA is determined based on a distance indicated by the base station.

In another embodiment, the base station directly indicates a distance value, a TA value, or a TAC value to the terminal. The value varies according to different message 1 formats, and the terminal calculates/determines a corresponding TA value.

For example, the base station directly indicates a distance value to the terminal, for example, distance=50/100/120 km, and the terminal uses the following formula:

Maximum $TA = 2 * \text{distance}/c$, to calculate a maximum TA value.

For example, the base station uses 1 bit to indicate two types of candidate distance values corresponding to different message 1 formats, as shown in the following table:

| Preamble format | | Time length of a cyclic prefix TCP | Time length of a time-domain sequence TSEQ | Time length of a guard period TGP | Path profile | Larger value K (km) | Smaller value M (km) |
|---|---|---|---|---|---|---|---|
| A | 1 | 288 | 4096 | 0 | 96 | 11 | 1 |
|   | 2 | 576 | 8192 | 0 | 144 | 33 | 3 |
|   | 3 | 864 | 12288 | 0 | 144 | 54 | 4 |
| B | 1 | 216 | 4096 | 72 | 96 | 11 | 1 |
|   | 2 | 360 | 8192 | 216 | 144 | 32 | 2 |
|   | 3 | 504 | 12288 | 360 | 144 | 52 | 2 |
|   | 4 | 936 | 24576 | 792 | 144 | 114 | 4 |
| C | 0 | 1240 | 2048 | 1096 | 144 | 6 | 6 |
|   | 2 | 2048 | 8192 | 2916 | 144 | 40 | 10 |

In the table, K is a larger distance value, M is a smaller distance value. The distance values K and M are respectively indicated by using indication bits of 0 and 1 or 1 and 0. The distance value may be determined based on coverage distances corresponding to different random access preamble formats, or may be a smallest value that is greater than a distance of a farthest terminal and that is estimated by the base station by using a message 1.

For a specific distance value, the quantity of candidate distance values and the quantity of bits used for indication are not limited, provided that a constraint distance is less than 300 kilometers. A manner of indicating by the base station includes performing indication on a PBCH/in SI/in a SIB 1/in a SIB 2/in RMSI/in Msg2 DCI/in an Msg2 MAC header/in an Msg2 RAR. The terminal determines a corresponding distance value based on the indication, and determines a time gap between the message 2 and the message 3 according to the following formula:

Maximum $TA = 2 * \text{distance}/c$.

Various indications that are provided by the base station to the terminal and that are mentioned in the foregoing examples may be implemented in one or more of the following manners:

a PBCH/SI/a SIB 1/a SIB 2/RMSI/Msg2 DCI/an Msg2 MAC header/an Msg2 RAR.

In another embodiment, for all terminals (within coverage of a beam/cell) served by the base station, the base station separately calculates TAs of the terminals, selects a largest TA, and notifies all the terminal devices of the largest TA, so that each terminal device determines a gap between a message 2 and a message 3 in a random access process based on the largest TA. For example, the base station may obtain TAs of users through calculation by using a random access preamble/DMRS/SRS sent by the terminal, then select a largest TA, and notify the terminal of the largest TA, so that the terminal determines a gap between a message 2 and a message 3 in a random access process. In the gap, N1, N2, and L2 are obtained in an original manner and remain unchanged. An indication manner includes using Msg2 DCI, a MAC PDU, or a RAR.

In addition, the TA notified by the base station to the terminal may alternatively be a specified value, and the specified value needs to be greater than or equal to the largest TA. Further, a specified value closest to the largest TA may be used.

If the base station directly indicates a TA to the terminal, because a maximum TA in NR may reach 2 ms, not all possibilities can be enumerated by using limited bits. A feasible manner is to quantize a TA of 2 ms and use limited bits in Msg2 DCI/a MAC PDU/a RAR for indication.

In a possible manner, X bits are used for indication in the Msg2 DCI/MAC PDU/RAR. For example, a table corresponding to X=4 bits used for indication is as follows:

| Index index | TA (μs) | Index | TA (μs) |
|---|---|---|---|
| 0 | 9 | 8 | 125 |
| 1 | 18 | 9 | 250 |
| 2 | 27 | 10 | 375 |
| 3 | 36 | 11 | 500 |
| 4 | 45 | 12 | 750 |
| 5 | 54 | 13 | 1000 |
| 6 | 63 | 14 | 1500 |
| 7 | 72 | 15 | 2000 |

Steps of an index 0 to an index 7 are 9 μs, which is approximately equal to a time length of one symbol of 120 kHz. Steps of an index 8 to an index 15 are 125 μs, 250 μs, and 500 μs, which are time lengths of one slot of 120 kHz, 60 kHz, and 30 kHz respectively. For example, if a largest TA in TAs of all terminals is 25, 27 in the foregoing table may be selected. This is because 27 is greater than 25 and is closest to 25. Therefore, index=2 is delivered to the terminal. Certainly, a numeral of 36, 45, or the like that is greater than 25 may alternatively be selected. However, this increases a TA value.

A specific indication manner is as follows: If a largest TA in TAs of users served by a beam/cell is X, a smallest TA greater than X in the foregoing table is selected, and a 4-bit index corresponding to the smallest TA is indicated in Msg2 DCI/a MAC PDU (PDSCH)/a RAR. After obtaining a TA based on an index, the terminal calculates a gap between an Msg2 and an Msg3.

In another possible manner, the base station directly indicates a time length that needs to be waited for before the Msg3 is sent. The method includes indicating, to the terminal by using one or more of a SIB 1/a SIB 2/RMSI/Msg2 DCI/a MAC PDU/a RAR, a quantity of slots that need to be waited for after the message 2 is received. A candidate slot set is {0, 1, 2, 3, 4, 5, 6, 7, 8, 10, 16, 20, 32}, and the slot is based on a PUSCH of the Msg3. The duration includes a shortest gap between a time at which the terminal receives the Msg2 and a time at which the terminal sends the Msg2, and also includes duration for the terminal to perform bandwidth part (Bandwidth part) switching, and the like.

In another implementation, each terminal uses a TA of the terminal. To be specific, for each user served by the beam/cell, the user uses a TA of the user to calculate a gap between an Msg2 and an Msg3. The base station notifies and delivers a TA of each user in a TAC field in the RAR. To be specific, after determining TAs of terminals, the base station separately delivers the TAs to the terminals, and does not use a same largest TA. Alternatively, a value greater than the TA of the terminal may be selected for each TA.

Based on a TA in a TAC field, the terminal selects a smallest TA that is greater than the value and that is in the table, namely, a closest TA, to calculate the gap and determine a location for sending the message 3.

| Index index | Maximum TA (μs) | Index | Maximum TA (μs) |
|---|---|---|---|
| 0 | 9 | 8 | 125 |
| 1 | 18 | 9 | 250 |
| 2 | 27 | 10 | 375 |
| 3 | 36 | 11 | 500 |
| 4 | 45 | 12 | 750 |
| 5 | 54 | 13 | 1000 |
| 6 | 63 | 14 | 1500 |
| 7 | 72 | 15 | 2000 |

For example, a TAC sent by using a RAR to a terminal 1 is 15 μs. In the foregoing table, the TA for index=1 is greater than 15 μs. The gap is calculated by using TA=18. This is because 18 is greater than 15 and is closest to 15 in the foregoing table.

For the base station, because the base station already calculates a TA of a user based on a message 1, the base station also selects a TA in the same manner, calculates a gap between an Msg2 and an Msg3 of the terminal, and receives a message 3 of the user in a corresponding location.

In the foregoing embodiments, a proposal of a solution in which the terminal determines the TA based on the TAC indicated by the base station in the standard is as follows:

The duration of TA in the time gap between Msg2 and Msg3, N1+duration of N2+L2+TA, is indicated by Msg2 with [2] bits explicitly or figured out implicitly based on the maximum one of TACs contained in Msg2, which is common for all the UEs receiving the Msg2.

In another embodiment, the base station configures a TA scale factor and sends the scale factor to the terminal, and the terminal determines a TA based on the scale factor, to reduce a gap between a message 2 and a message 3. This solution may be combined with the solutions mentioned in the foregoing embodiments.

For example, the base station indicates a scale factor in one or more of a SIB 1/a SIB 2/RMSI/Msg2 DCI/a MAC PDU/an Msg2 MAC PDU. The terminal determines a TA with reference to the foregoing embodiments, multiplies the TA by the scale factor to obtain the final TA, and uses the final TA to determine the time gap between the Msg2 and the Msg3.

For example, a predefined scale factor is Factor={1, ½, ¼, ⅛, 1/16, 1/32, 1/64, 1/128}. The base station determines that a largest TA in TAs of all served terminals is X ms, and the base station uses a 3-bit index to indicate the scale factor. For example, index =3 is factor=⅛. In this case, the TA actually used to calculate the gap is ⅛*X. The value X may be a maximum TA (based on an SCS of the Msg3) corresponding to 3846/1282 supported based on 12 bits, or may be a TA indicated by the base station or a TA determined by the terminal in the foregoing embodiments of this application. This is not limited herein. In addition, the scale factor may further be associated with a preamble, and different scale factors are set for different preambles.

Figure 2:
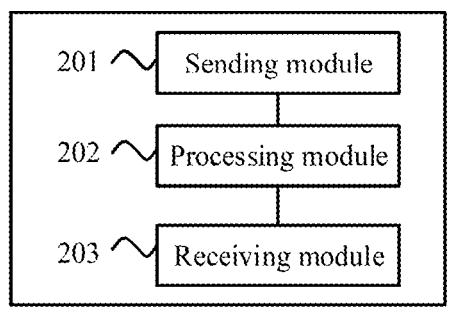
FIG. 2 is a schematic diagram of a network device/terminal device according to an embodiment of this application.

An embodiment of this application further discloses the network device and the terminal device in the foregoing method embodiments. Referring to FIG. 2, one or more of the following modules are included: a sending module 201, a receiving module 203, and a processing module 202.

The foregoing network device and terminal device completely correspond to the network device and the terminal device in the method embodiments, and a corresponding module performs a corresponding step. For example, the sending module performs a sending step in the method embodiments, the receiving module performs a receiving step in the method embodiments, and other steps different from the sending step and the receiving step may be performed by the processing module. For functions of specific modules, refer to the corresponding method embodiments. The following shows an example.

A delay reduction apparatus is provided, where the apparatus is a terminal device or a chip or module of a terminal device, and includes:

a sending module, configured to send a message 1 to a network device, where the message 1 is a random access preamble; and a receiving module, configured to receive a message 2 sent by the network device, where the sending module is further configured to send a message 3 to the network device after a time gap, where the time gap includes a timing advance TA.

Correspondingly, a delay reduction apparatus is provided. The apparatus is a network device or a chip or module of a network device, and includes:

a receiving module, configured to receive a message 1 sent by a terminal device, where the message 1 is a random access preamble; and a sending module, configured to send a message 2 to the terminal device; where the receiving module is further configured to receive, after a time gap, a message 3 sent by the terminal device, where the time gap includes a timing advance TA.

With reference to the foregoing two apparatuses:

the TA is related to a message 1 format of the terminal device;

the TA is related to a message 1 format of the terminal device and a cell radius supported by the message 1;

the TA is related to a message 1 format of the terminal device and a subcarrier spacing supported by the message 1;

the TA is related to a message 1 format of the terminal device, a cell radius supported by the message 1, and a subcarrier spacing supported by the message 1;

the TA is related to a message 1 format of the terminal device and a minimum subcarrier spacing and/or maximum cell radius of the message 1 in a frequency range in which the terminal device operates;

the TA is determined based on a timing advance command TAC value indicated by the network device, where the TAC is less than or equal to 3846 and is greater than or equal to a largest TAC in TACs of one or more terminal devices served by the network device;

the TA may be alternatively determined based on a distance indicated by the network device, where the distance is less than or equal to 300 km and is greater than or equal to a largest distance in distances of one or more terminal devices served by the network device; or the TA is a TA indicated by the network device, and the TA is less than or equal to 2 ms and is greater than or equal to a largest TA in TAs of one or more terminal devices served by the network device.

With reference to the foregoing apparatus, the sending module of the network device is further configured to send, to the terminal device, indication information indicating whether the network device uses a beam sweeping manner to receive the random access preamble; and the receiving module of the terminal device is further configured to receive the indication information.

With reference to the foregoing apparatus, the sending module of the network device is further configured to send a TA scale factor to the terminal device, where the TA scale factor is less than 1; and the receiving module of the terminal device is further configured to receive the TA scale factor.

In addition, the foregoing apparatuses may further include a processing module, configured to perform steps other than steps of sending and receiving in the method embodiments, for example, steps such as calculation and TA determining steps.

The foregoing network device and terminal device are merely examples, and corresponding modules may be used to form corresponding apparatuses according to different method embodiments.

Figure 3:
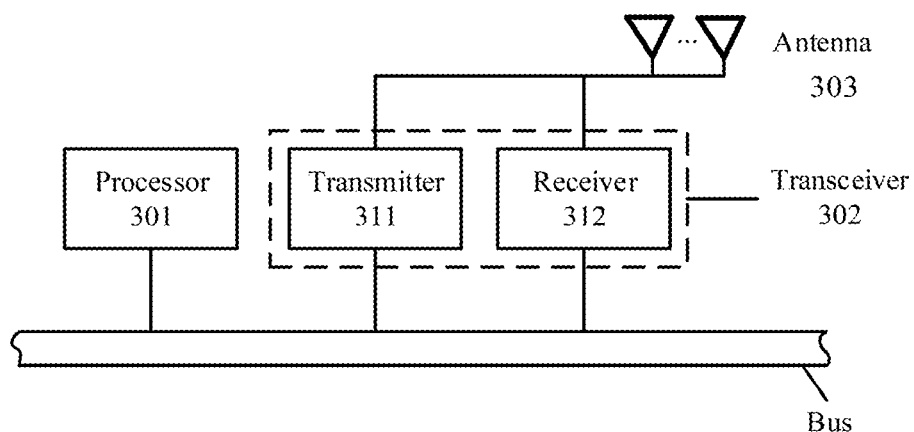
FIG. 3 is a schematic diagram of a network device/terminal device according to another embodiment of this application.

For a specific structure of the foregoing apparatus embodiment in another form, refer to FIG. 3. A processor 301 may a general-purpose processor, a digital signal processor, an application-specific integrated circuit, a field programmable gate array, or another programmable logic device.

The transmitter 311 and the receiver 312 may form the transceiver 302. An antenna 303 may be further included, and there may be one or more antennas.

In addition, a memory may further be included, and is configured to store related information such as a program or code. The memory may be an independent component, or may be integrated into the processor.

The foregoing components may be coupled together by using a bus. In addition to a data bus, the bus further includes a power bus, a control bus, and a status signal bus. However, for clear description, various types of buses in the figure are marked as the bus.

FIG. 3 is merely a schematic diagram. Alternatively, another element may be included or only a part of elements may be included. For example, the transmitter and the receiver are included, or only the transmitter, the receiver, and the processor are included.

Each of the components or a part of the components in FIG. 3 may be integrated into a chip for implementation, for example, integrated into a baseband chip for implementation.

Further, in a specific embodiment, a memory (not shown in the figure) may further be included, and is configured to store computer-executable program code. The program code includes an instruction, and when the processor executes the instruction, the instruction enables the network device or terminal device to perform a corresponding step in the method embodiments.

The memory may be an independent physical unit, and may be connected to the processor by using a bus. Alternatively, the memory and the processor may be integrated together, and implemented by using hardware, or the like.

The memory is configured to store a program for implementing the foregoing method embodiments or each module in the apparatus embodiments, and the processor invokes the program to perform operations in the foregoing method embodiments.

Optionally, when the random access preamble sending method and the random access preamble receiving method in the foregoing embodiments are completely or partially implemented by using software, the apparatus may alternatively include only a processor. The memory configured to store the program is located outside the apparatus. The processor is connected to the memory by using a circuit/wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof The PLD may be a complex programmable logic device (CPLD), a field-programmable gate array (FPGA), a generic array logic (GAL), or any combination thereof The memory may include a volatile memory (volatile memory), for example, a random access memory (RAM). The memory may alternatively include a non-volatile memory (non-volatile memory), for example, a flash memory (flash memory), a hard disk drive (HDD), or a solid-state drive (SSD). The memory may alternatively include a combination of the foregoing types of memories.

An embodiment of this application further provides a computer storage medium, storing a computer program. The computer program is configured to perform a method provided in the foregoing embodiments.

An embodiment of this application further provides a computer program product including an instruction. When the computer program product runs on a computer, the computer is enabled to perform a method provided in the foregoing embodiments.

All or a part of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

In this application, "at least one" refers to one or more, and "a plurality of" refers to two or more. "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one item (one piece) of the following" or a similar expression thereof refers to any combination of these items, including any combination of singular items (pieces) or plural items (pieces). For example, at least one item (one piece) of a, b, or c may indicate: a, b, c, a-b, a-c, b-c, or a-b-c, where a, b, and c may be singular or plural.

What is disclosed above is merely example embodiments of this application, and certainly is not intended to limit the protection scope of this application. Therefore, equivalent variations made based on the claims of this application shall fall within the scope of this application.

What is claimed is:

1. A delay reduction method, applied to a random access process, the method comprising:
sending, by a terminal device, a message 1 to a network device, wherein the message 1 is a random access preamble; receiving, by the terminal device, a message 2 sent by the network device; and sending, by the terminal device, a message 3 to the network device, wherein a time gap between receiving the message 2 and sending the message 3 is set by the terminal based on a timing advance (TA) value, wherein:
the TA value is related to a message 1 format of the terminal device and a cell radius supported by the message 1;
the TA value is related to a message 1 format of the terminal device and a subcarrier spacing supported by the message 1;
the TA value is related to a message 1 format of the terminal device, a cell radius supported by the message 1, and a subcarrier spacing supported by the message 1;
the TA value is related to a message 1 format of the terminal device and a minimum subcarrier spacing and/or a maximum cell radius of the message 1 in a frequency range in which the terminal device operates;
the TA value is determined based on a timing advance command (TAC) value indicated by the network device, wherein the TAC value is less than or equal to 3846 and is greater than or equal to a largest TAC value in TAC values of one or more terminal devices served by the network device;
the TA value is determined based on a distance value indicated by the network device, wherein the distance value is less than or equal to 300 km and is greater than or equal to a largest distance value in distance values of one or more terminal devices served by the network device; or
the TA value is a TA value indicated by the network device, and the TA value is less than or equal to 2 ms and is greater than or equal to a largest TA value in TA values of one or more terminal devices served by the network device.

2. The method according to claim 1, wherein the method further comprises: receiving, by the terminal device, indication information sent by the network device, wherein the indication information is used to notify the terminal device of whether the network device uses a beam sweeping manner to receive the random access preamble.

3. The method according to claim 1, wherein the TAC value, the TA value, or the distance value is indicated by the network device by using one or more of a physical broadcast channel (PBCH), system information (SI), remaining system information (RMSI), a system information block 1, a system information block 2, message 2 downlink control information (Msg2 DCI), a message 2 media access control header (Msg2 MAC header), and a message 2 random access response (Msg2 RAR).

4. The method according to claim 1, wherein the TA value is further related to a scale factor indicated by the network device, and the scale factor is less than 1.

5. A delay reduction method, applied to a random access process, the method comprising:
receiving, by a network device, a message 1 sent by a terminal device, wherein the message 1 is a random access preamble; sending, by the network device, a message 2 to the terminal device; and receiving, by the network device, a message 3 sent by the terminal device, wherein a time gap between receiving the message 2 and sending the message 3 is set by the terminal based on a timing advance (TA) value, wherein:
the TA value is related to a message 1 format of the terminal device and a cell radius supported by the message 1;
the TA value is related to a message 1 format of the terminal device and a subcarrier spacing supported by the message 1;
the TA value is related to a message 1 format of the terminal device, a cell radius supported by the message 1, and a subcarrier spacing supported by the message 1;
the TA value is related to a message 1 format of the terminal device and a minimum subcarrier spacing and/or a maximum cell radius of the message 1 in a frequency range in which the terminal device operates;
the TA value is determined based on a timing advance command (TAC) value indicated by the network device, wherein the TAC value is less than or equal to 3846 and is greater than or equal to a largest TAC value in TAC values of one or more terminal devices served by the network device;
the TA value is determined based on a distance value indicated by the network device, wherein the distance value is less than or equal to 300 km and is greater than or equal to a largest distance value in distance values of one or more terminal devices served by the network device; or
the TA value is a TA value indicated by the network device, and the TA value is less than or equal to 2 ms and is greater than or equal to a largest TA value in TA values of one or more terminal devices served by the network device.

6. The method according to claim 5, wherein the method further comprises: sending, by the network device, indication information to the terminal device, wherein the indication information is used to notify the terminal device whether the network device uses a beam sweeping manner to receive the random access preamble.

7. The method according to claim 5, wherein the TAC value, the TA value, or the distance value is indicated by the network device by using one or more of a physical broadcast channel (PBCH), system information (SI), remaining system information (RMSI), a system information block 1, a system information block 2, message 2 downlink control information (Msg2 DCI), a message 2 media access control header (Msg2 MAC header), and a message 2 random access response (Msg2 RAR).

8. The method according to claim 5, wherein the TA value is further related to a scale factor indicated by the network device, and the scale factor is less than 1.

9. A delay reduction apparatus, wherein the apparatus is a terminal device or a chip or module of a terminal device, and the apparatus comprises:

a transmitter, configured to send a message 1 to a network device, wherein the message 1 is a random access preamble; and a receiver, configured to receive a message 2 sent by the network device, wherein the transmitter is further configured to send a message 3 to the network device, wherein a time gap between receiving the message 2 and sending the message 3 is set by the apparatus based on a timing advance (TA) value, wherein:

the TA value is related to a message 1 format of the terminal device and a cell radius supported by the message 1;

the TA value is related to a message 1 format of the terminal device and a subcarrier spacing supported by the message 1;

the TA value is related to a message 1 format of the terminal device, a cell radius supported by the message 1, and a subcarrier spacing supported by the message 1;

the TA value is related to a message 1 format of the terminal device and a minimum subcarrier spacing and/or a maximum cell radius of the message 1 in a frequency range in which the terminal device operates;

the TA value is determined based on a timing advance command (TAC) value indicated by the network device, wherein the TAC value is less than or equal to 3846 and is greater than or equal to a largest TAC value in TAC values of one or more terminal devices served by the network device;

the TA value is determined based on a distance value indicated by the network device, wherein the distance value is less than or equal to 300 km and is greater than or equal to a largest distance value in distance values of one or more terminal devices served by the network device; or the TA value is a TA value indicated by the network device, and the TA value is less than or equal to 2 ms and is greater than or equal to a largest TA value in TA values of one or more terminal devices served by the network device.

10. The apparatus according to claim 9, wherein the receiver is further configured to: receive indication information sent by the network device, wherein the indication information is used to notify the terminal device of whether the network device uses a beam sweeping manner to receive the random access preamble.

11. The apparatus according to claim 9, wherein the TAC value, the TA value, or the distance value is indicated by the network device by using one or more of a physical broadcast channel (PBCH), system information (SI), remaining system information (RMSI), a system information block 1, a system information block 2, message 2 downlink control information (Msg2 DCI), a message 2 media access control header (Msg2 MAC header), and a message 2 random access response (Msg2 RAR).

12. The apparatus according to claim 9, wherein the TA value is further related to a scale factor indicated by the network device, and the scale factor is less than 1.

13. A delay reduction apparatus, wherein the apparatus is a network device or a chip or module of a network device, and the apparatus comprises:

a receiver, configured to receive a message 1 sent by a terminal device, wherein the message 1 is a random access preamble; and a transmitter, configured to send a message 2 to the terminal device;

wherein the receiver is further configured to receive a message 3 sent by the terminal device, wherein a time gap between receiving the message 2 and sending the message 3 is set by the terminal based on a timing advance (TA) value, wherein the TA value is related to a message 1 format of the terminal device and a cell radius supported by the message 1;

the TA value is related to a message 1 format of the terminal device and a subcarrier spacing supported by the message 1;

the TA value is related to a message 1 format of the terminal device, a cell radius supported by the message 1, and a subcarrier spacing supported by the message 1;

the TA value is related to a message 1 format of the terminal device and a minimum subcarrier spacing and/or a maximum cell radius of the message 1 in a frequency range in which the terminal device operates;

the TA value is determined based on a timing advance command (TAC) value indicated by the network device, wherein the TAC value is less than or equal to 3846 and is greater than or equal to a largest TAC value in TAC values of one or more terminal devices served by the network device;

the TA value is determined based on a distance value indicated by the network device, wherein the distance value is less than or equal to 300 km and is greater than or equal to a largest distance value in distance values of one or more terminal devices served by the network device; or the TA value is a TA value indicated by the network device, and the TA value is less than or equal to 2 ms and is greater than or equal to a largest TA value in TA values of one or more terminal devices served by the network device.

14. The apparatus according to claim 13, wherein the transmitter is further configured to send indication information used to indicate whether the network device uses a beam sweeping manner to receive the random access preamble to the terminal device.

15. The apparatus according to claim 13, wherein the transmitter is further configured to send a TA scale factor to the terminal device, and the TA scale factor is less than 1.

16. The apparatus according to claim 13, wherein the TAC value, the TA value, or the distance value is indicated by the network device by using one or more of a physical broadcast channel (PBCH), system information (SI), remaining system information (RMSI), a system information block 1, a system information block 2, message 2 downlink control information (Msg2 DCI), a message 2 media access control header (Msg2 MAC header), and a message 2 random access response (Msg2 RAR).

* * * * *